United States Patent [19]
Malamud et al.

[11] Patent Number: 5,664,133
[45] Date of Patent: Sep. 2, 1997

[54] CONTEXT SENSITIVE MENU SYSTEM/ MENU BEHAVIOR

[75] Inventors: Mark A. Malamud, Seattle; John E. Elsbree, Everett; Laura J. Butler, Bellevue; David A. Barnes, Jr., Seattle, all of Wash.

[73] Assignee: Microsoft Corporation, Redmond, Wash.

[21] Appl. No.: 648,807

[22] Filed: Apr. 30, 1996

Related U.S. Application Data

[63] Continuation of Ser. No. 166,339, Dec. 13, 1993, abandoned.

[51] Int. Cl.[6] .................................................. G06F 15/00
[52] U.S. Cl. ........................ 345/352; 345/339; 345/396; 345/146
[58] Field of Search .................................... 395/326, 333, 395/335, 339, 340–343, 346–348, 352–354; 345/146, 145

[56] References Cited

U.S. PATENT DOCUMENTS

| | | | |
|---|---|---|---|
| 4,789,962 | 12/1988 | Berry et al. | 395/338 |
| 5,157,768 | 10/1992 | Hoeber et al. | 395/338 |
| 5,204,947 | 4/1993 | Bernstein et al. | 395/157 |
| 5,241,645 | 8/1993 | Cimral et al. | 395/500 |
| 5,243,697 | 9/1993 | Hoeber et al. | 395/334 |
| 5,249,300 | 9/1993 | Bachman et al. | 395/800 |
| 5,297,249 | 3/1994 | Bernstein et al. | 395/356 |
| 5,347,628 | 9/1994 | Brewer et al. | 395/351 |
| 5,581,686 | 12/1996 | Koppolu et al. | 395/340 |

OTHER PUBLICATIONS

Microsoft Windows v. 3.1, Microsoft Corporation, 1985–1992.

*Primary Examiner*—Kee M. Tung
*Assistant Examiner*—U. Chauhan
*Attorney, Agent, or Firm*—Seed and Berry LLP

[57] ABSTRACT

A method and system are described for a computer system for retrieving and presenting a set of commands in the form of a pop up context menu for a selected object. The context menu is displayed in the proximity of the selected object and is determined primarily by the class of the selected object and secondarily by the particular container in which the selected object resides at the time of selection. The context menu displays a number of useful features which enable the user to quickly and easily invoke commands upon the selected object.

38 Claims, 9 Drawing Sheets

CONTEXT SENSITIVE MENU SYSTEM/ MENU BEHAVIOR

CROSS-REFERENCE TO RELATED APPLICATION

This application is a continuation of U.S. patent application Ser. No. 08/166,339, filed Dec. 13, 1993, now abandoned.

AREA OF THE INVENTION

This invention relates to the field of user interfaces for computer systems, and more particularly to graphical user interfaces wherein a user selects from a collection of graphical representations displayed upon a video screen corresponding to actual computer resources.

BACKGROUND OF THE INVENTION

The United States has experienced an extraordinary expansion in the ownership and utilization of computers. Computers, once considered primarily the tools of scientists, can now be found in a substantial portion of the homes and businesses across the country. Though partial credit for the unprecedented growth in the utilization of computers is attributable to lower costs associated with manufacturing computers and related peripheral devices which has made such equipment affordable to a much larger segment of the public, the credit is equally, if not more, attributable to the enhanced versatility, ease in learning to use, and ease of using computers which is provided by the operating systems and applications software running on the now affordable computers.

It is therefore very important when designing an operating system, and more particularly a user interface for a computer system, to provide a high degree of user friendliness, which incorporates ease of learning and ease in using the computer system. Users appreciate a system which enables them to accomplish their computer related tasks with the least amount of obstacles and delays. A considerable number of the computer users/operators today base their like or dislike of a computer system upon the user interface's time and effort saving features as well as display features which enhance the interface's aesthetic appeal.

The Windows operating system and its series of menus and buttons has simplified the use of the computer system. The Windows operating system is unquestionably easier to learn than earlier operating systems. Even more importantly the Windows operating system enables a user to access a great number of computer resources from any given screen by selecting ones of the many menu items and control buttons.

Another concern of computer interface developers is the learnability of new interface features. One of the believed advantages of the newer mouse-type menu driven operating systems is the ease with which users learn how to invoke the various system commands. Much of the success in improving the usability of the operating systems is attributed to the large amount of visual information provided at each decision making step.

A known manner for presenting the commands and resources available to a user is the use of menus. Menus have been presented to the user in the form of menu bars presenting selections appropriate for a given window or container, pop-up menus presenting choices appropriate for an object, and tear off menus which are characterized by their persistence on the display screen even after a user has made a selection.

Many applications have become so complex that the set of choices provided to the user for an application by means of the menu bars, which are generally intended to cover all types of objects in all possible contexts, becomes unmanageable when all of the choices are presented at the same time. It is therefore desirable for a computer system to provide some mechanism for restricting the set of choices presented to a user.

Furthermore, in view of the complex user interfaces existing today providing the user with a large number of choices and many diverse manners to access the choices, it is important to provide the user with a robust user interface selection system for guaranteeing that the computer system executes commands according to the desires of the user. To this end, safeguards against inadvertent selections are extremely desirable. In a graphical user interface, the user tends to rely heavily upon visual prompts and therefore safeguards are most effectively implemented when they incorporate some visual aspect into the safeguard.

A noticeable trend in graphic user interfaces has been to increase the amount of information displayed on a display screen. Menus have become less manageable. Multiple selection modes increase the likelihood of user confusion. It is therefore desirable to counter the increased cluttering of the display screen by the menus provided by the present graphical user interfaces, and the resulting user confusion, by reducing the number of choices presented on the user interface at any given time and by presenting improved visual prompts to inform the user of the current state of the user interface. It is desirable to maintain or even enhance the ease with which computer resources are accessed by means of the graphical user interface.

SUMMARY OF THE INVENTION

It is therefore an object of the present invention to display a reduced number of choices to a user which apply specifically to a selected computer resource or set of resources.

It is a further object of the present invention to present the reduced set of choices in a manner that clearly indicates to the user the state of the computer system at each state of the selection/execution process for a computer resource.

It is a further object of the present invention to present the choices provided to a user by a graphical user interface in a manner that the user may quickly and easily select/execute the desired computer resource.

The above and other objects are achieved by a computer system having a graphical user interface which presents a set of representations corresponding to computer resources including objects and controls. When a user selects a computer resource by placing the display pointer over a computer resource and clicking a context button, or by any other suitable selection signal to the computer system, the computer system registers the computer resource and displays a context menu when the user releases the context button. The context menu presents a set of choices to the user based primarily upon the selected computer resource. The set of choices is secondarily determined by the particular environment in which the computer resource resides at the time of the selection.

The manner in which the choices are presented and the behavior of the context menu, which is also applicable to the other known menu types, are summarized below. First, the computer system visually tracks the movement of the display pointer when the user releases the context button after selecting the computer resource and when the user depresses a button while the context menu is displayed. The computer system provides two distinguishable highlight display features in order to provide visual feedback to the user of the present selection mode of the computer system.

Furthermore, menu of the present invention includes executable cascade items and non-executable cascade names. Both cascade items and cascade names are associated with cascade menus which the computer system displays after a short delay when the user positions the display pointer over the cascade item/name. Both cascade items and names include executable items in the resulting cascade menus. However, clicking a mouse while the display pointer is positioned over the cascade item causes the computer to execute the default operation listed in the cascade menu for the cascade item.

In addition, in order to indicate to the user that a cascade item is executable, the text of the cascade item is highlighted when the user positions the display pointer over the cascade item. The text of a cascade name, which is not executable, does not highlight when a display pointer is moved over a cascade name.

Clicking the context button while the display pointer is positioned on an active menu item causes the computer system to dismiss the context menu and perform the operation associated with the menu item. Suitable menu items include objects, commands and controls. If the menu item is an object, the computer system performs a default operation associated with the object.

The combination of the above described features into menu features/behavior of a graphical user interface provide a less cluttered, easy to learn, easy to use, intuitive, and robust system for users to access and control applications.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE DRAWINGS

Figure 1:
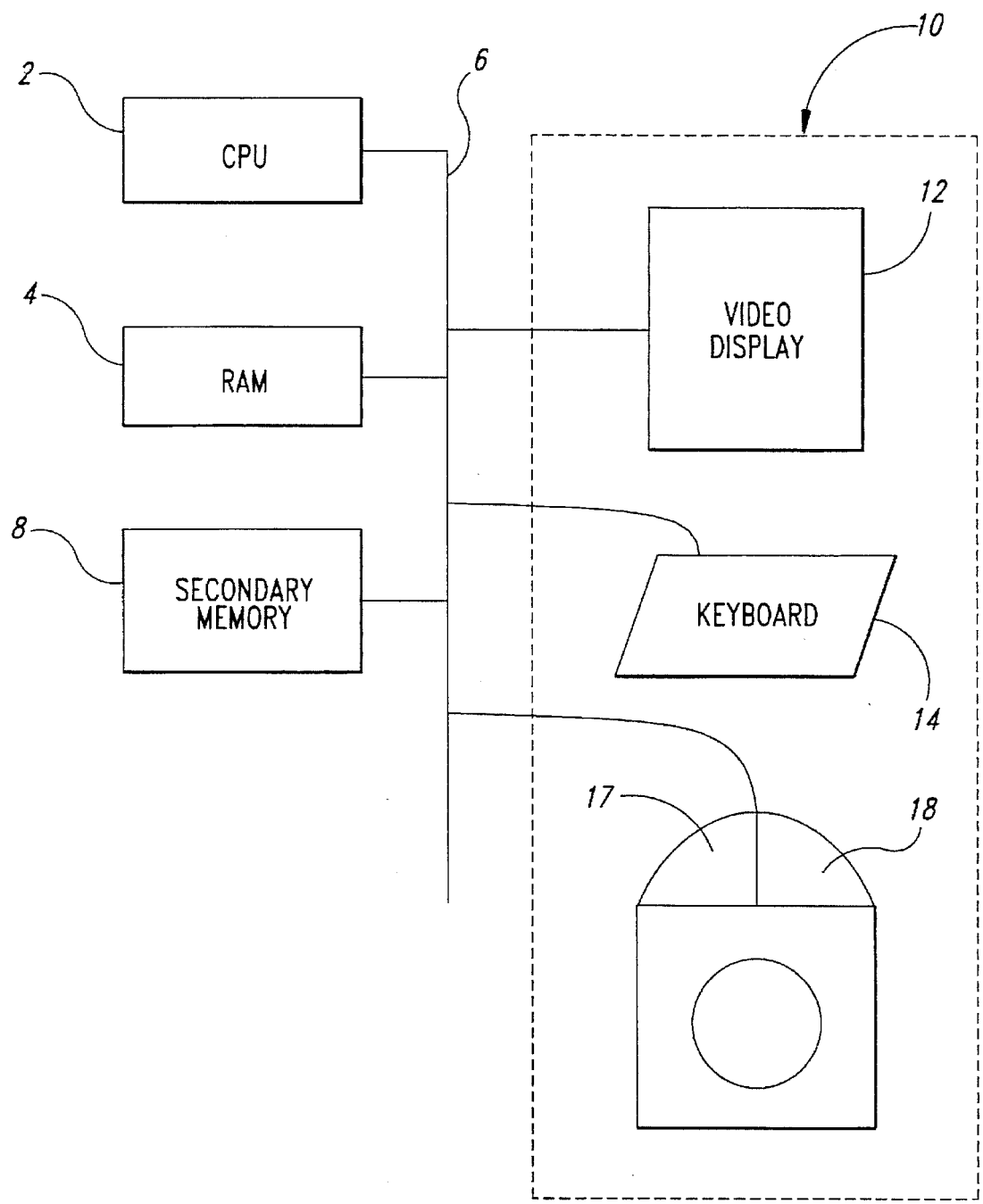
FIG. 1 is a schematic drawing of an exemplary computer system incorporating the present invention.

The computer system schematically illustrated in FIG. 1 comprises a central processing unit (CPU) 2 coupled by means of a bus 6 in a known manner to a random access memory 4. The CPU 2 is also coupled to a non-volatile secondary memory 8 for storing various system and applications routines and programs. The CPU 2 is coupled in known manner to a user interface 10 including a video display 12. The video display 12 may be any of a number of known display devices including, for example, monochrome and color cathode ray tubes and LCD displays. The user interface 10 also includes a keyboard 14 and mouse 16 to facilitate the submission of instructions to the CPU 2. The mouse 16 includes a default selection button 17 and a context button 18. Though not shown in FIG. 1, the computer system may also include a number of peripheral units as would be known to those skilled in the art. The computer system hardware depicted in FIG. 1 is intended merely to show a representative hardware configuration. It would of course be understood by one of ordinary skill in the art that the present invention encompasses other computer system hardware configurations and is not limited to the computer system hardware configuration described above.

Figure 2:
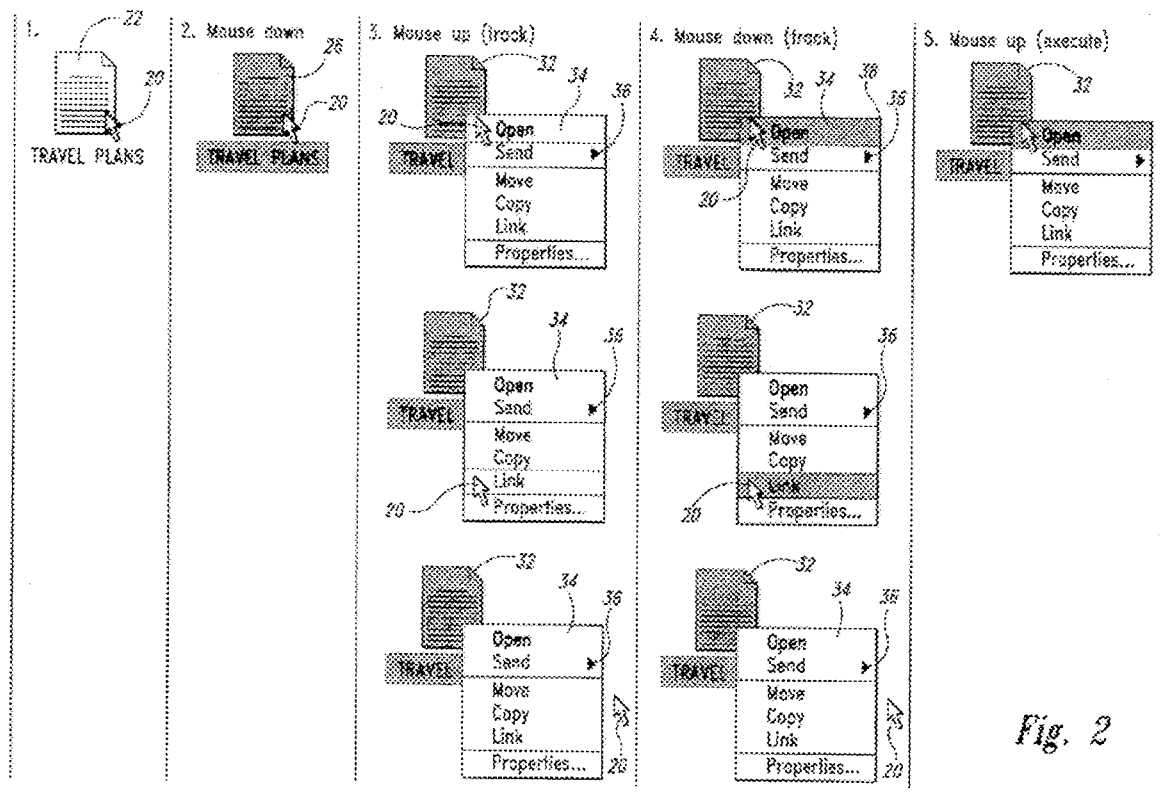
FIG. 2 is a sequence of views of a display screen illustrating the relation between a mouse, a display pointer and a context menu for a selected computer resource.

Turning now to FIG. 2, a set five columns of icons are provided to demonstrate the various modes of a computer resource having a context menu. The steps for carrying out the generation and manipulation of a context menu for a computer resource are described below in conjunction with the flow diagram provided in FIG. 3 as well as other figures which expand upon certain steps depicted in FIG. 3. In addition, FIG. 2 depicts a number of unique menu behaviors which enhance the utility of context menus.

The preferred mouse for the present invention includes the default selection button 17 which, in a known manner, selects a computer resource during a first click of the default selection button 17 and executes a default command upon the selected computer resource in response to clicking the default selection button 17 while the display pointer remains on the selected computer resource.

The preferred mouse for the present invention also includes the context button 18. The operation of the context button 18 closely parallels the operation of the default selection button 17. The operation of the context button 18 is summarized in FIG. 3. As shown in column 1 of FIG. 2, the user positions the display pointer 20 over a file icon 22. In accordance with steps 100 and 102 of FIG. 3, pressing down on the context button 18 while the display pointer 20 is displayed over the file icon 22 "selects" that computer resource. The computer system visually indicates to the user that the computer resource corresponding to the file icon 22 has been selected by highlighting the file icon 22 in a known manner. For backgrounds having an associated context menu, the computer system also generates an insertion point 24 resembling an asterisk. Th insertion point 24 provides the user with a point of reference for where the computer system will display a context menu. Thus, the behavior of the context menu portion of the computer system provides the user with some degree of flexibility in deciding where the context menu for an object will be displayed. Column 2 of FIG. 2 depicts a highlighted selected file icon 26. Other suitable means for highlighting a selected computer resource would be known to those of ordinary skill in the art of graphic user interfaces. Control then passes to step 104 wherein the computer system waits for the user to release the context button 18.

When the context button 18 is released, control passes to step 106 wherein the computer system determines whether the display pointer 20 is still over the computer resource previously selected when the user depressed the context button 18. If the user releases the context button 18 while the display pointer 20 is displayed on the selected computer resource, control passes to step 108 wherein the computer system generates a context menu for the selected computer resource. In the preferred embodiment of the present invention, the computer system generates context menus for a variety of computer resources including: system level objects, document sub-parts, controls, and title bars. At the completion of step 108, the computer system displays a context menu for the computer resource comprising a list of selections.

Figure 4A:
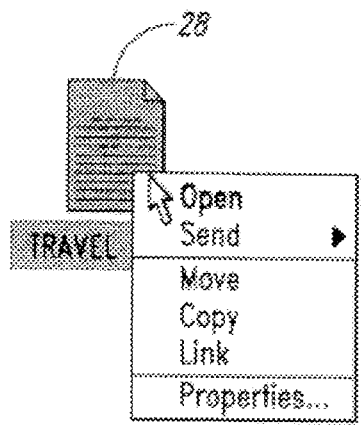
FIGS. 4a and 4b illustrate the differing context menus for a standard icon for a document and a mini (open) icon for the opened document.
Figure 4B:
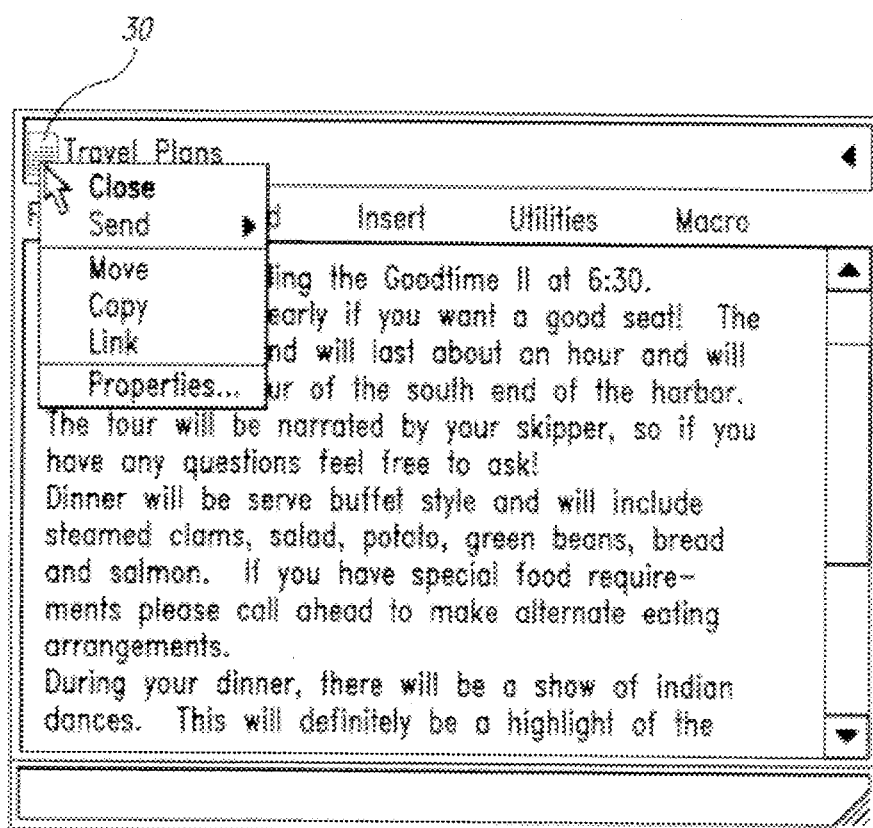

In contrast to known menu bars, the items listed on the context menu are determined primarily by the computer resource for which they are displayed instead of a surrounding container. Once the initial set of menu items is generated based upon the selected computer resource(s), the computer system augments the set of menu items specific to the computer resource(s) with additional menu items based upon the context in which a user selects the computer resource(s). For example, turning to FIGS. 4a and 4b, the context menu for the icon 28 for a closed document shown in FIG. 4a does not include the "close" menu item. However, turning to FIG. 4b, the icon 30 for the opened document includes the "close" menu item, but does not include the "open" menu item. Another example of context is a context menu for an object embedded within a document differing from the same object embedded within a folder.

The steps for generating a context menu are summarized in FIG. 5 and are described below. Upon completion of these steps, the selections listed upon context menus include one or more of the following: commands specific to the object such as Edit, View, Open, and Print; commands added by the container such as Delete; selection specific commands such as formatting commands for a document sub-part; control commands specific to a particular control; source and destination transfer commands; and properties.

Figure 5:
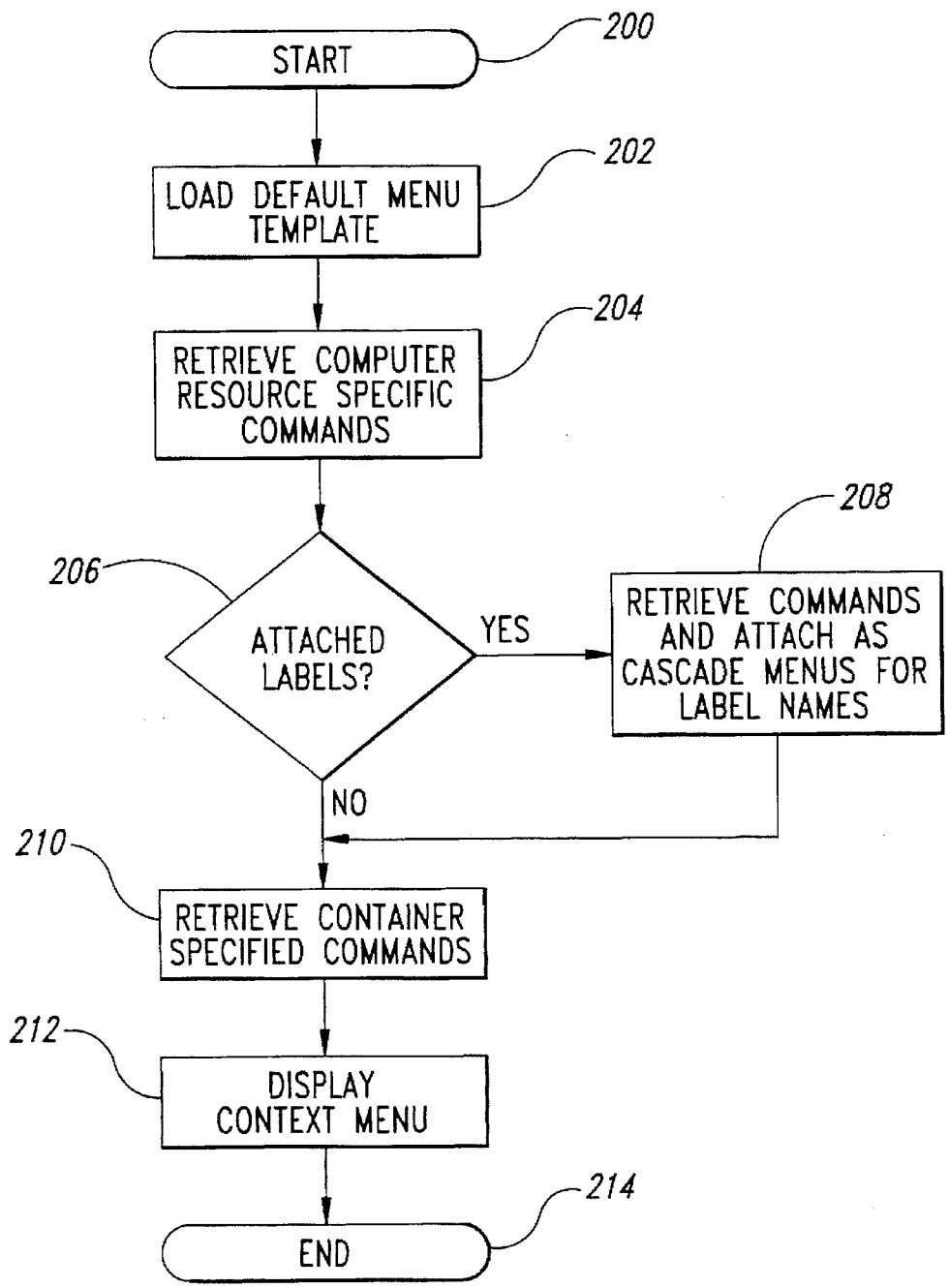
FIG. 5 is a flow diagram summarizing the steps executed by the computer system to generate a context menu.

Turning now to FIG. 5 the steps are summarized for the generation of a context menu for a computer resource. From the start 200 of the context menu generation procedure, control passes to step 202 wherein the computer system loads the default menu template into the list of items and names for the context menu. The default menu template, provided for all context menus regardless of the container or computer resource for which the context menu is being created, includes a known list of transfer related commands, help items and properties. Control then passes to step 204.

At step 204, the computer system retrieves a set of commands relating to the specific class of the computer resource for which the context menu is being generated and adds the set of object specific commands to the list of items and names for the context menu. Control then passes to step 206 wherein the computer system determines whether any labels are attached to the computer resource. An example of a label in a computer resource is a "cc:" label in a document. If the computer resource contains attached labels, then control passes to step 208 wherein the computer system retrieves all commands relating to the attached labels. Each attached label name (for which a command is retrieved) is added to the context menu list for the resource, and the commands relating to each label are attached to the label name as cascade menu items. Control passes next to step 210, wherein the computer system retrieves commands provided by the container in which the computer resource resides and adds the container specific commands to the context menu list.

Figure 6:
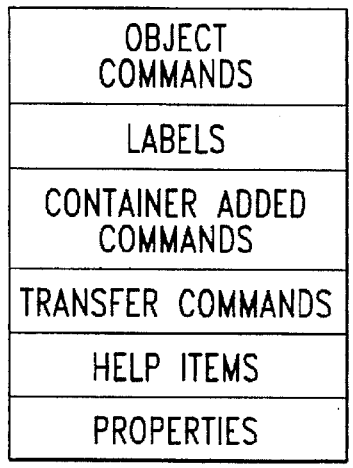
FIG. 6 is a schematic depiction of the fields of the context menu.

If the computer system determines at step 206 that no labels are attached to the computer resource, then control passes to step 210 described above. Control then passes to step 212 wherein the computer system in a known manner transforms the list of context menu commands compiled during the preceding steps into a displayed context menu. The structure of the fields of the context menu are depicted in FIG. 6. Thereafter, control passes to the end step 214 and control passes to step 112 of the procedure summarized in FIG. 3.

Returning to FIG. 2, the file icon 32 and context menu 34 at the head of column 3 of FIG. 2 depict the initial appearance of a context menu generated for a selected file icon. As previously mentioned, examples of other computer resources for which the computer system of the present invention generates context menus include system level objects, document sub-parts, controls, and title bars. The computer system highlights a default item for the context menu. The default item is the selection that the computer system executes automatically when the user selects and executes an operation on an object by means of the default selection button 17. In this particular example, the default item is the "Open" item which is highlighted in bold typeface.

At step 112, the computer system commences enhanced visual tracking of the position of the display pointer 20 upon the context menu and waits for receipt of a signal indicating that the user depressed either the context button 18 or default selection button 17. Continuing with the description of FIG. 2, column 3 includes a series of 3 views which depict tracking/display features of a context menu that enhance the utility of the graphic user interface. In the example provided in column 3 of FIG. 2, the computer system tracks movement of the display pointer 20 by changing the color or shade of the text of an active menu item contained in the menu when the display pointer 20 points to the active menu item. In the middle view of column 3 of FIG. 2, the computer system highlights the text for the "Link" menu item since the display pointer 20 is within the boundaries of the "Link" menu item. As illustrated by the bottom view of column 3 of FIG. 2, if the display pointer 20 is moved outside the context menu 34 during step 112, no text is highlighted.

A context menu may also include cascade names and cascade items. A cascade name is not executable. Instead a cascade name provides a menu including a set of executable items. The user chooses an executable menu item from a cascade menu corresponding to a cascade name, and the computer system then performs the operation corresponding to the cascade menu item. Since cascade names are not executable, the text of a cascade name is not highlighted (as described above for executable menu items) during menu tracking.

Figure 8:
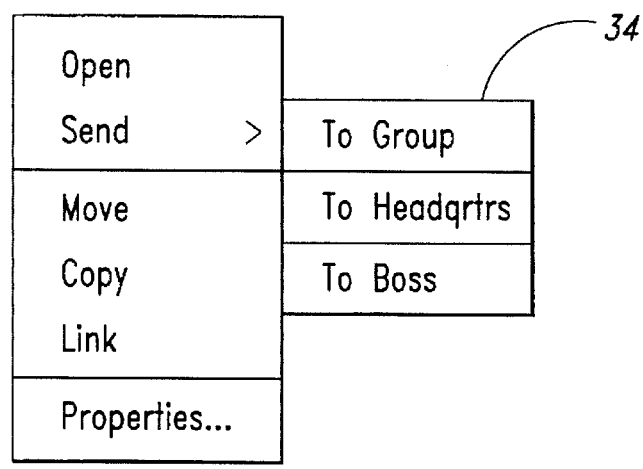
FIG. 8 is an illustrative example of a cascade name and its cascade menu.

If the user moves the display pointer 20 over a cascade menu name in the context menu 34 such as the "Send" selection in the example in FIG. 2, then only the triangle 36 changes its color or shade and a cascade menu (illustratively depicted in FIG. 8) automatically appears after a short delay to prevent flashing of the cascade when the display pointer 20 is merely drawn quickly through the cascade name in order to access another menu selection.

Cascade items, in addition to providing a cascade menu having executable menu items, are executable. Execution of the cascade item without selecting a menu item within the cascade menu causes the computer system to select a default menu item from the cascade menu.

Another feature of cascade menus for the context menus is the ability to move the display pointer 20 outside the cascade name area (in the illustrative example, the "Send"

menu selection area) or the area for the cascade menu corresponding to the cascade name for a short period of time without causing the computer system to retract the cascade menu. Furthermore, if the user drags the display pointer 20 over another context menu selection such as the "Move" selection in order to access the items in a cascade menu (not shown) associated with the "Send" cascade name, the computer system will not respond to the presence of the display pointer 20 within the "Move" selection area. Incorporating this known method for accessing a cascade menu into the specific environment of a context menu further enhances the utility of the context menu by enabling a user to access the items of a cascade menu by moving the display pointer 20 in a diagonal direction instead selecting a cascade menu item by means of a horizontal movement of the display pointer 20 onto the cascade menu and then a vertical movement to a specific cascade menu item.

The display characteristics for cascade menu items follow the same behavior as the menu items presented on a context menu. The computer system highlights an active cascade menu item when the user positions the display pointer 20 within the boundaries of the active cascade menu item, and cascade menu items are executed in the same manner as context menu items.

Figure 3:
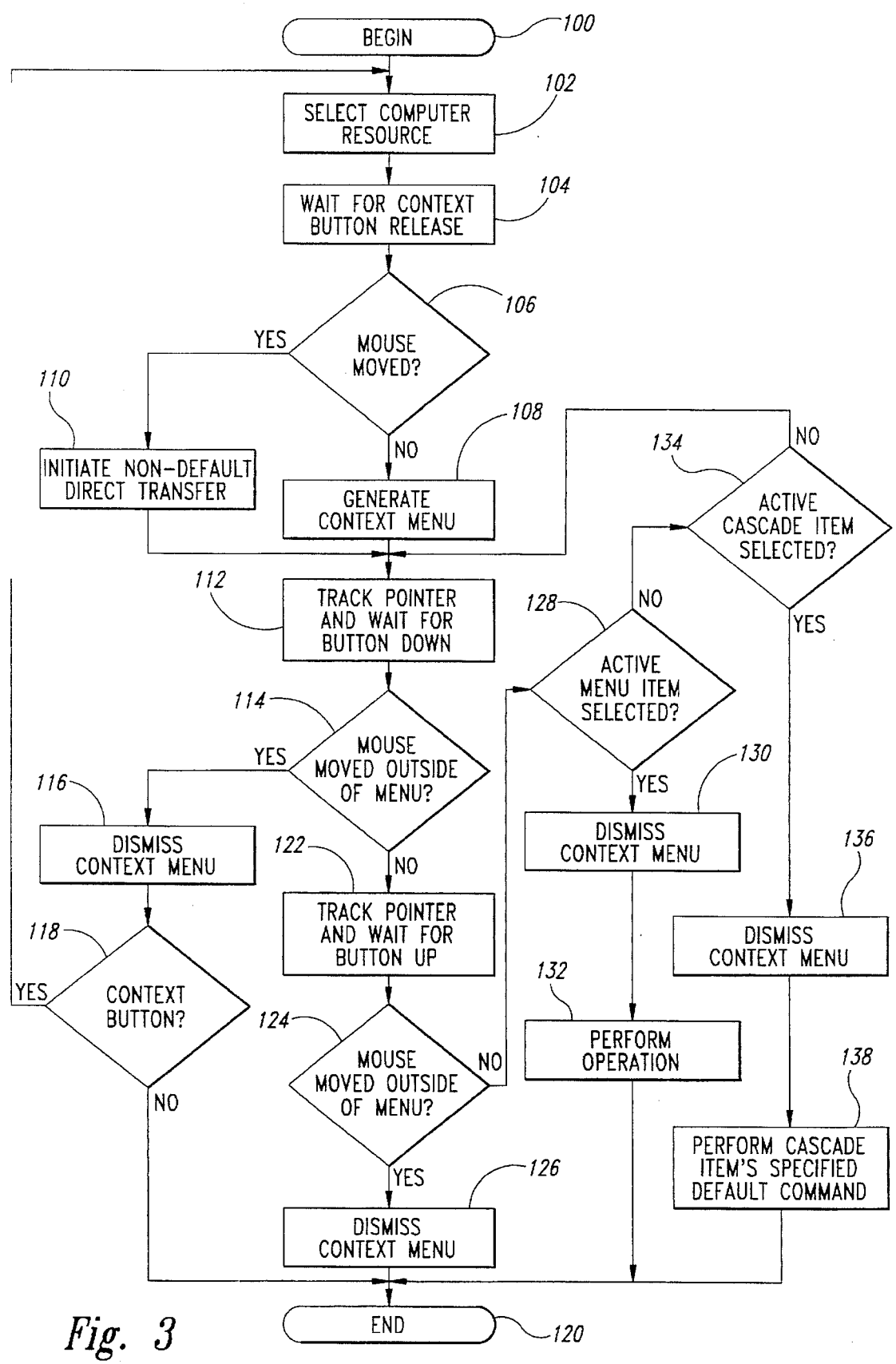
FIG. 3 is a flow diagram summarizing the steps executed by a computer system in generating a context menu for a selected computer resource and making a selection from the generated context menu.

Continuing with the description of FIG. 3, when either the default selection button 17 or the context button 18 is depressed by the user at step 112, control passes to step 114. If the computer system determines in a known manner that the display pointer 20 was outside the context menu 34 and the user depressed the default selection button 17 or the context button 18, then control passes to step 116 and the computer system dismisses the displayed context menu 34. Control then passes to step 118 wherein if the context button 18 was depressed to cause the dismissal of the context menu 34 during step 116 then control passes to step 102. If however the default selection button 17 was depressed to cause the dismissal of the context menu 34 during step 116, then control passes to the end step 120.

Continuing with the description of step 114, if the user depresses the context button 18 or the default selection button 17 while the display pointer 20 is within the context menu 34, then control passes to step 122 wherein the computer system continues to track the movement of the display pointer 20 and waits for the user to release the button. The views provided in column 4 of FIG. 2 illustratively depict the behavior of the context menu 34 at step 122. The tracking behavior of the context menu after the user depresses the default selection button 17 or the context button 18 is equivalent to the tracking behavior described in association with column 3 of FIG. 2; however, the background for an active menu item is highlighted rather than the text of the active menu item. This feature is depicted by the background 38 for the "Open" selection in the top view of column 4 in FIG. 2. The highlighted background 38 for the selection indicates to the user that the highlighted selection will be executed when the user releases the button.

When the user releases the default selection button 17 or the context button 18 at step 122, control passes to step 124. If the display pointer 20 is outside the context menu 34 (at step 124), then control passes to step 126 wherein the computer system dismisses the context menu 34. Control then passes to the end step 120.

If however at step 124 the display pointer 20 is within the context menu 34, then control passes to step 128. If at step 128 the computer system determines that the display pointer 20 is over an active menu item such as the "Open" menu item in FIG. 2, then control passes to step 130 wherein the context menu 34 is dismissed. Control then passes to step 132 wherein the computer system performs the "Open" operation on the file. Control then passes to the end step 120.

If at step 128 the display pointer is not over an active menu item, then control passes to step 134. If at step 134 the computer determines that the display pointer 20 is over an active cascade item, then control passes to step 136 wherein the context menu is dismissed. Control then passes to step 138 wherein the computer system identifies a default cascade menu item. The computer system then performs the operation associated with the default cascade menu item. If the user selects a cascade item at step 122, then control of the computer system will eventually pass to step 138 wherein the computer system executes the default cascade menu item for the cascade item.

If at step 134 the computer determines that the context button 18 was released while the display pointer 20 was positioned over an inactive menu selection or the pointer 20 was positioned over a cascade name, then control passes to step 112 and the computer system continues to display the context menu 34 and track the position of the display pointer 20 as depicted in column 3 of FIG. 2.

If the computer system at step 106 determines that a user selected a first computer resource and then moved the display pointer 20 outside the display region for a first computer resource before releasing the context button 18, then no context menu will appear for the first computer resource. Instead, control passes to step 110 wherein the computer system generates a context menu for a second computer resource pointed to by the display pointer 20 when the user released the context button 18.

Figure 7:
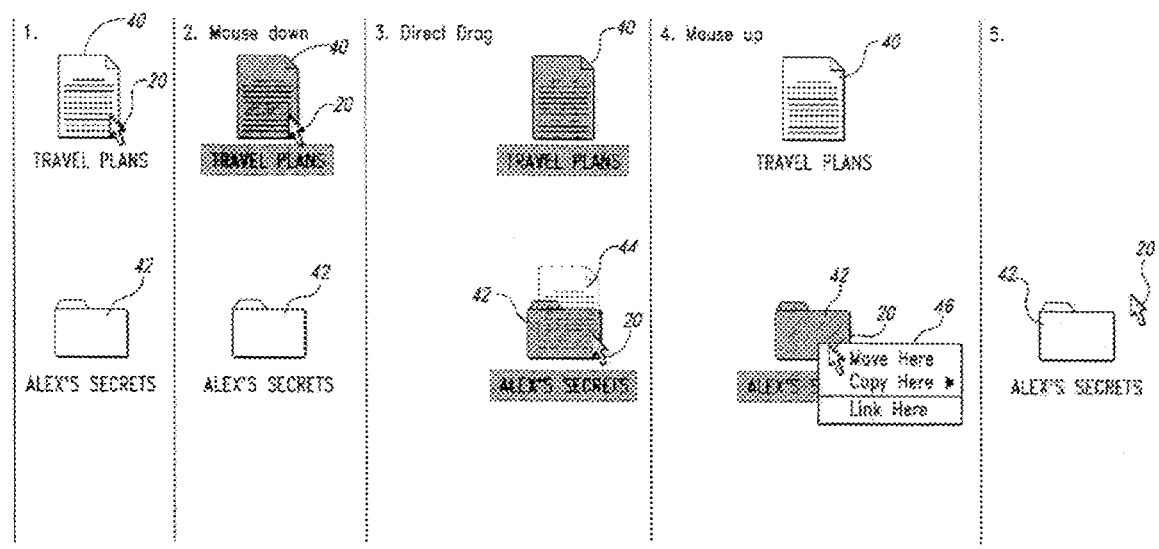
FIG. 7 is a series of views illustratively depicting the states of two related objects while generating a context menu based upon multiple related objects.

Turning briefly to FIG. 7, the operation of dropping a document into a folder using the context button 18 is depicted by a series of five display states for a file icon 40 and a folder icon 42. In the first state, the user has moved the display pointer 20 over a file icon 40. In the second state, the user has selected the file icon 40 by pressing down upon the context button 18. This corresponds to step 102 in FIG. 2. In the third state, the user has moved the display pointer 20 over a folder icon 42. As the user moves the display pointer 20 while holding the context button 18 down, the computer system displays a ghost icon 44 corresponding to the file icon 40 to visually inform the user that the file icon 40 was selected before moving the display pointer 20.

In the forth state, the user has released the context button 18, and the computer system, in accordance with step 110 of FIG. 5 has generated a context menu 46 listing operations that can be executed by the computer system based upon the relationship between the file icon 40 and folder icon 42.

The default operation, presented in bold typeface, is the "Move Here" operation. Execution of the "Move Here" menu item in accordance with the steps depicted in FIG. 2 and previously described above causes the file corresponding o the file icon 40 to be placed in the folder corresponding to the folder icon 44. The fifth state depicted in FIG. 7 shows the state of the display after the default command, "Move Here", has been executed by the computer system. As is apparent from the view of the fifth state, the file icon 40 disappears from the screen to reflect the placement of the file into the folder corresponding to the folder icon 44.

It should be noted that even though the generation of a context menu for a computer resource in accordance with the present invention has been described with respect to a user manipulating a mouse controlled display pointer 20, equivalent operation of the context menu is provided through the use of pre-arranged keyboard signals with equivalent display behavior by the graphic user interface. In some cases, the user may actually use both the keyboard 14 and mouse 16 to generate a context menu and execute an item on the context menu.

The computer system is capable of generating a context menu for multiple selected objects. If the multiple selected objects contain differing context menus, then the context menu generated for the multiple selected objects is the intersection of the menu items for each of the selected objects.

Figure 9:
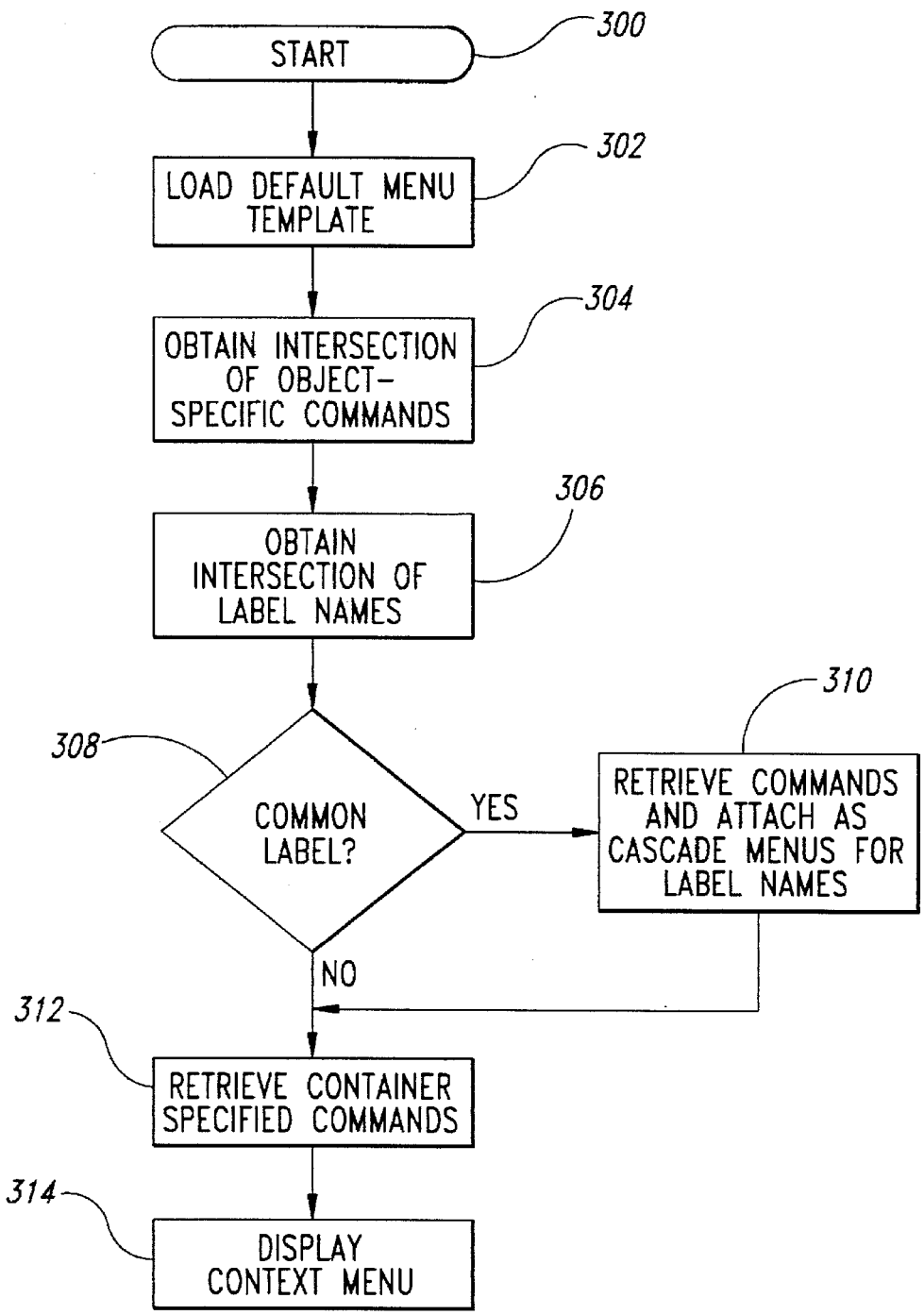
FIG. 9 is a flow diagram summarizing the steps for generating a context menu for a set of selected objects.

The steps of the procedure for obtaining a context menu for multiple selected objects having different context menus are summarized in FIG. 9. When the user releases the context button 18 after selecting multiple objects, control passes to the start 300 of the procedure summarized in FIG. 9. Control then passes to step 302 wherein the computer system loads the default menu template into the list of items and names for the context menu in the same manner described for a context menu for a single context menu. Control then passes to step 304 wherein the computer system retrieves a separate list of object specific commands for each of the selected objects, then compares the lists to obtain the intersection of the lists of object specific commands for the selected objects. The computer system adds any object specific commands common to all of the selected objects to the items and names for the context menu list. Control then passes to step 306 wherein the computer system obtains the intersection of the labels for the selected resources. Control then passes to step 308.

If the computer system determines at step 308 that there are labels common to all of the objects, then control passes to step 310 wherein the computer system retrieves all commands relating to the labels. Each label name for which commands were retrieved is added to the context menu list, and the retrieved commands are added as cascade menus for the label names added to the context menu list. Control then passes to step 312.

If at step 308 the computer system determines that there are no labels common to all of the selected objects then control passes to step 312 wherein the computer system retrieves commands provided by the container in which the objects reside and adds the container specific commands to the context menu list. Control then passes to step 314 wherein the computer system in a known manner transforms the list of context menu commands compiled during the preceding steps into a displayed context menu for the selected group of objects. Thereafter, control passes to the end step 316.

Figure 10A:
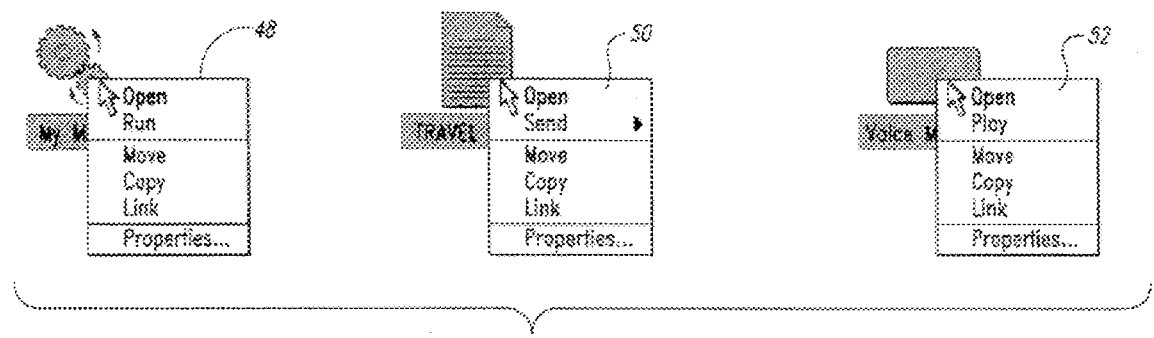
FIGS. 10a and 10b provide an illustrative example of an intersection of context menus for multiple selected objects.
Figure 10B:
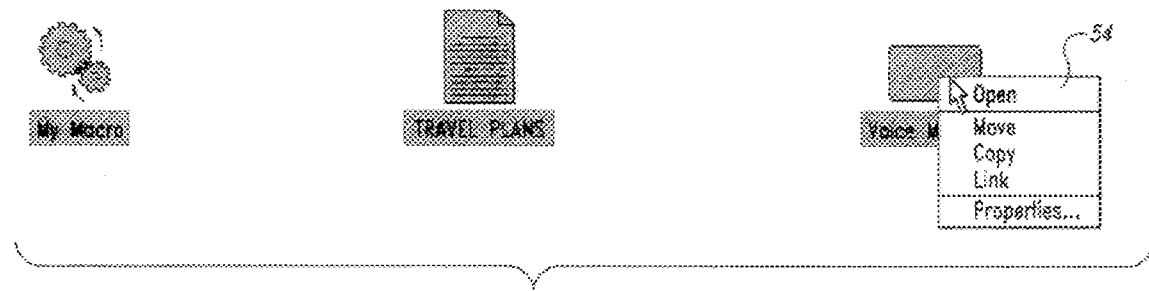

Turning to FIG. 10a, a context menu for a first object 48 contains a "Run" menu item, a context menu for a second object 50 contains a "Send" cascade name, and a context menu for a third object 52 contains a "Play" menu item in its context menu. Since the "Run", "Send", and "Play" menu items/name are not contained in all three context menus, the context menu 54 in FIG. 10b resulting at the end of step 108 from the multiple selection of all three of the objects does not include the "Run", "Send", or "Play" menu items/name. If the user selects the multiple objects and then clicks the default selection button 17, then the computer system executes the default action for each of the computer resources.

A further enhancement to the behavior of menus is the inclusion of file system objects as menu items. Selecting an object in a menu causes the computer system to execute the default command on the object.

A preferred embodiment Of a system for providing context menus in a graphical user interface environment has been described. It would of course be known to one of ordinary skill in the area of user interfaces for computers and operating system in general to make certain modifications and to the afore-described methods and system which would not depart from the scope and spirit of the invention described in the claims appended hereinafter. In particular, though a preferred method for carrying out context menus has been presented, it will be recognized by those skilled in the art that the above invention can be carried out in a number of different manners including rearranging or even substituting certain ones of the steps summarized in the flow diagrams as well as using alternative appropriate data structures relating to the context menus, and to consult information of a different type than that specifically listed in order to determine the context in which a menu for a selected computer resource is generated.

It is contemplated that even though use of a keyboard to select computer resources in accordance with the steps of the present invention is no considered the best way to implement the present invention, a keyboard can replace the mouse controlled display pointer without departing from the scope of the present invention.

Furthermore, even though new menu behavior has been described using a context menu as a primary example, the described menu behavior applies as well to other menus including menu bars and tear off menus. Tear off menus are a known menu type. A tear off menu behaves substantially the same as a context menu. However, a tear off menu is always active, and a tear off menu is dismissed by executing a close command upon the tear off menu.

It would also be known to utilize the present invention within other computer configurations such as a local area network, or a group of computer work stations sharing a mainframe operating system.

What is claimed is:

1. In a computer system having a central processing unit (CPU), a graphical user interface including a display and a user interface selection device communicatively coupled to the CPU, a method for providing, and selecting from, a menu for a selected computer resource, said method comprising the steps of:

generating a set of menu selections for the selected computer resource in response to receiving, by the CPU, a context menu generation signal from the user interface selection device, the generating step comprising the steps of:

retrieving a menu selection relating to a class of objects to which the selected computer resource belongs; and retrieving a menu selection associated with a container in which the selected computer resource resides; and displaying upon the display the set of menu selections in a menu positioned in the proximity of a graphical representation of the selected computer resource.

2. The method of claim 1 wherein the step of generating a set of menu selections further comprises the step of:

retrieving a label based menu selection based upon a label contained within the selected computer resource.

3. The method of claim 2 wherein the step of generating a set of menu selections further comprises the step of retrieving a label name menu selection for the label contained within the selected computer resource, and wherein the displaying step further comprises displaying a cascade menu adjacently to the label name menu selection, the cascade menu including the label based menu selection.

4. The method of claim 1, wherein the user interface selection device includes a default execution button and a separate and distinct context button, and wherein the context menu generation signal comprises a context button up signal transmitted by the user interface selection device.

5. The method of claim 1 further comprising the steps of:
visually tracking, in a first mode, the positioning of a display pointer within the set of displayed menu selections; and
receiving, by the CPU, a first signal while visually tracking in the first mode and, in response thereto, visually tracking, in a second mode visually distinguishable from the first mode, the positioning of the display pointer within the set of displayed menu selections.

6. The method of claim 5 further comprising the steps of:
receiving, by the CPU, a second signal while visually tracking in the second mode and, in response thereto, performing the steps of:
identifying a one of the set of displayed menu selections on which the display pointer is positioned; and
performing an operation associated with the one of the set of displayed menu selections.

7. The method of claim 6 wherein the first signal comprises a button down signal transmitted by a mouse, and the second signal comprises a button up signal transmitted by the mouse.

8. The method of claim 1 wherein the set of displayed menu selections includes a file system object menu selection corresponding to a file system object, and wherein said method further comprises the steps of receiving, by the CPU, an execution signal while a display pointer is positioned on the file system object menu selection and, in response thereto, performing a default command associated with the file system object menu selection.

9. In a computer system having a central processing unit (CPU), a graphical user interface including a display and a user interface selection device communicatively coupled to the CPU, a method for providing, and selecting from a menu associated with a second selected computer resource, said method comprising the steps of:
selecting a first computer resource in response to receiving, by the CPU, a first signal from the user interface selection device;
generating a set of menu selections for a second computer resource associated with a transfer of the first computer resource to the second computer resource in response to receiving, by the CPU, a second signal from the user interface selection device after selecting the first computer resource; and
displaying upon the display the set of menu selections in a menu positioned in the proximity of a graphical representation of the second computer resource.

10. The method of claim 9 wherein the first computer resource is a document and the second computer resource is a folder.

11. The method of claim 9 wherein the user interface selection device includes a default execution button and a separate and distinct context button, further comprising the steps of:
transmitting by the user interface selection device a context button down signal comprising the first signal; and
transmitting by the user interface selection device a context button up signal comprising the second signal.

12. In a computer system having a central processing unit (CPU), a graphical user interface including a display and a user interface selection device communicatively coupled to the CPU, a method for providing, and selecting from, a menu for a set of selected computer resources said method comprising the steps of:
generating a set of menu selections for the set of selected computer resources in response to receiving, by the CPU, a context menu generation signal and a multiple select mode signal from the user interface selection device, the generating step comprising the steps of:
retrieving a menu selection obtained by taking the intersection of sets of object specific commands associated with the set of selected computer resources; and
retrieving a menu selection associated with a container in which the set of selected computer resources resides; and
displaying upon the display the set of menu selections in a menu.

13. The method of claim 12 wherein the step of generating a set of menu selections further comprises the step of:
retrieving a label based menu selection based upon a label contained within each computer resource of the set of selected computer resources.

14. The method of claim 13 wherein the step of generating a set of menu selections further comprises the step of retrieving a label name menu selection for the label contained within each selected computer resource, and wherein the displaying step further comprises displaying a cascade menu adjacently to the label name menu selection, the cascade menu including the label based menu selection.

15. The method of claim 12, wherein the context menu generation signal comprises a context button up signal transmitted by a mouse.

16. The method of claim 12 further comprising the steps of:
visually tracking, in a first mode, the positioning of a display pointer within the set of displayed menu selections; and
receiving, by the CPU, a first signal while visually tracking in the first mode and, in response thereto, visually tracking, in a second mode visually distinguishable from the first mode, the positioning of the display pointer within the set of displayed menu selections.

17. The method of claim 16 further comprising the steps of:
receiving, by the CPU, a second signal while visually tracking in the second mode and, in response thereto, performing the steps of:
identifying a one of the set of displayed menu selections on which the display pointer is positioned; and
performing an operation corresponding to the one of the set of displayed menu selections.

18. A graphical user interface providing context sensitive menu options to a user for a selected computer resource in a computer system having a central processing unit (CPU), a display, and a user interface selection device communicatively coupled to the CPU, the graphical user interface comprising:
means for generating a set of menu selections for the selected computer resource in response to receiving, by the CPU, a context menu generation signal from the user interface selection device, the means for generating comprising:
means for retrieving a menu selection relating to a class of computer objects to which the computer resource belongs, and means for retrieving a menu selection associated with a container in which the computer resource resides; and means for displaying upon the display the set of menu selections in a menu positioned in the proximity of a graphical representation of the selected computer resource.

19. The graphical user interface of claim 18 wherein the means for generating a set of menu selections further comprises means for retrieving a label based menu selection based upon a label contained within the selected computer resource.

20. The graphical user interface of claim 19 wherein the means for generating a set of menu selections further comprises means for retrieving a label name menu selection for the label contained within the selected computer resource, and wherein the means for displaying further comprises means for displaying a cascade menu adjacently to the label name menu selection, the cascade menu including the label based menu selection.

21. The graphical user interface of claim 18, wherein the user interface selection device includes a default execution button and a separate and distinct context button, and wherein the context menu generation signal comprises a context button up signal transmitted by the user interface selection device.

22. The graphical user interface of claim 18 further comprising:

a first visual tracking mode for highlighting on the display in a first manner the positioning of a display pointer within the set of displayed menu selections;

a second visual tracking mode for highlighting on the display in a second manner, visually distinguishable from the first manner, the positioning of the display pointer within the set of displayed menu selections; and means for switching from the first visual tracking mode to the second visual tracking mode in response to receiving, by the CPU, a first signal.

23. The graphical user interface of claim 22 further comprising:

selection execution means for identifying a one of the set of displayed menu selections on which the display pointer is positioned and performing an operation corresponding to the one of the set of displayed menu selections in response to receiving, by the CPU, a second signal while the second visual tracking mode is actively tracking the positioning of the display pointer.

24. The graphical user interface of claim 23 wherein the first signal comprises a button down signal transmitted by a mouse, and the second signal comprises a button up signal transmitted by the mouse.

25. The graphical user interface of claim 18 wherein the set of displayed menu selections includes a file system object menu selection corresponding to a file system object, and wherein the graphical user interface further comprises means for executing a default command associated with the file system object when the CPU receives an execution signal while a display pointer is positioned on the file system object menu selection.

26. A graphical user interface for providing, and selecting from a menu associated with a second selected computer resource in a computer system having a central processing unit (CPU), a display and a user interface selection device communicatively coupled to the CPU, said graphical user interface comprising:

means for selecting a first computer resource in response to receiving, by the CPU, a first signal from the user interface selection device;

means for generating a set of menu selections for a second computer resource associated with a transfer of the first computer resource to the second computer resource in response to receiving, by the CPU, a second signal from the user interface selection device after selecting the first computer resource; and means for displaying upon the display the set of menu selections in a menu positioned in the proximity of a graphical representation of the second computer resource.

27. The graphical user interface of claim 26 wherein the first computer resource is a document and the second computer resource is a folder.

28. The graphical user interface of claim 26 wherein the user interface selection device includes a default execution button and a separate and distinct context button, and wherein the first signal comprises a context button down signal transmitted by the user interface selection device, and the second signal comprises a context button up signal transmitted by the user interface selection device.

29. A graphical user interface for providing, and selecting from, a menu for a set of selected computer resources in a computer system having a central processing unit (CPU), a display and a user interface selection device communicatively coupled to the CPU, said graphical user interface comprising:

means for generating a set of menu selections for the set of selected computer resources in response to receiving, by the CPU, a context menu generation signal and a multiple select mode signal from the user interface selection device, the means for generating comprising:

means for retrieving a menu selection obtained by taking the intersection of sets of object specific commands associated with the set of selected computer resources, and means for retrieving a menu selection associated with a container in which the set of selected computer resources resides; and means for displaying upon the display the set of menu selections in a menu.

30. The graphical user interface of claim 29 wherein the means for generating a set of menu selections further comprises means for retrieving a label based menu selection based upon a label contained within each computer resource of the set of selected computer resources.

31. The graphical user interface of claim 30 wherein the means for generating a set of menu selections further comprises means for retrieving a label name menu selection for the label contained within each selected computer resource, and wherein the means for displaying further comprises means for displaying a cascade menu adjacently to the label name menu selection, the cascade menu including the label based menu selection.

32. The graphical user interface of claim 29 wherein the context menu generation signal comprises a context button up signal transmitted by a mouse.

33. The graphical user interface of claim 29 further comprising:

a first visual tracking mode for highlighting on the display in a first manner the positioning of a display pointer within the set of displayed menu selections;

a second visual tracking mode for highlighting on the display in a second manner, visually distinguishable from the first manner, the positioning of the display pointer within the set of displayed menu selections; and means for switching from the first visual tracking mode to the second visual tracking mode in response to receiving, by the CPU, a first signal.

34. The graphical user interface of claim 33 further comprising:

selection execution means for identifying a one of the set of displayed menu selections on which the display pointer is positioned and performing an operation corresponding to the one of the set of displayed menu selections in response to receiving, by the CPU, a second signal while the second visual tracking mode is actively tracking the positioning of the display pointer.

35. A computer-readable storage medium for use in a computer system having a display device, a selected object having a visual representation stored in storage, and a container object in which the selected object is contained, said medium holding instructions for:

adding a menu selection, related to the class of objects to which the selected object belongs, to a menu;

adding a menu selection that is associated with the container in which the selected object is stored to the menu; and displaying the menu with the menu selections on the display device in proximity to the visual representation of the selected object.

36. The computer-readable storage medium of claim 35 wherein the selected object is a document.

37. The computer-readable storage medium of claim 35 wherein the container object is a folder.

38. A computer-readable storage medium for use in a computer system having a display device and a selected set of computer resources and a container object in which the selected set of computer resources resides stored in a storage device, the medium holding instructions for:

calculating an intersection of object-specific commands for the selected set of objects;

adding menu items for the calculated intersection of object-specific commands to a menu;

adding a menu item that is associated with the container to the menu; and displaying the menu with the menu items on the display device.

* * * * *